United States Patent
Koblyuk

(10) Patent No.: US 9,507,454 B1
(45) Date of Patent: Nov. 29, 2016

(54) ENHANCED LINEARITY OF GESTURES ON A TOUCH-SENSITIVE SURFACE

(75) Inventor: Petro Koblyuk, Lviv (UA)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 152 days.

(21) Appl. No.: 13/428,721

(22) Filed: Mar. 23, 2012

Related U.S. Application Data

(60) Provisional application No. 61/536,536, filed on Sep. 19, 2011.

(51) Int. Cl.
*G06F 3/041* (2006.01)

(52) U.S. Cl.
CPC .................... *G06F 3/0414* (2013.01)

(58) Field of Classification Search
CPC ............... G06F 3/0414; G06F 3/0416; G06F 2203/04808
See application file for complete search history.

(56) References Cited

U.S. PATENT DOCUMENTS

| | | | | |
|---|---|---|---|---|
| 5,396,584 A * | 3/1995 | Lee et al. | | 345/589 |
| 5,926,163 A * | 7/1999 | Nishimura | | 345/104 |
| 5,953,693 A * | 9/1999 | Sakiyama et al. | | 704/3 |
| 7,808,490 B2 * | 10/2010 | Chang et al. | | 345/173 |
| 8,164,577 B2 * | 4/2012 | Tsuzaki | G06F 3/0412 | 345/173 |
| 8,334,846 B2 * | 12/2012 | Westerman et al. | | 345/173 |
| 8,338,723 B2 * | 12/2012 | Kim | | 178/18.03 |
| 8,954,895 B1 * | 2/2015 | Yaksick et al. | | 715/863 |
| 2001/0043198 A1 * | 11/2001 | Ludtke | | 345/173 |
| 2002/0030667 A1 * | 3/2002 | Hinckley et al. | | 345/173 |
| 2002/0093491 A1 * | 7/2002 | Gillespie et al. | | 345/173 |
| 2003/0063073 A1 * | 4/2003 | Geaghan et al. | | 345/173 |
| 2004/0178997 A1 * | 9/2004 | Gillespie et al. | | 345/173 |
| 2005/0083313 A1 * | 4/2005 | Hardie-Bick | | 345/177 |
| 2006/0066590 A1 * | 3/2006 | Ozawa et al. | | 345/173 |
| 2006/0164384 A1 * | 7/2006 | Smith et al. | | 345/156 |
| 2006/0227114 A1 | 10/2006 | Geaghan et al. | | |
| 2006/0244733 A1 * | 11/2006 | Geaghan | | 345/173 |
| 2006/0265653 A1 * | 11/2006 | Paasonen et al. | | 715/704 |
| 2006/0279583 A1 * | 12/2006 | Obara | | 345/660 |
| 2007/0008298 A1 * | 1/2007 | Ohta | | 345/173 |
| 2007/0046677 A1 * | 3/2007 | Hong et al. | | 345/442 |
| 2007/0085850 A1 * | 4/2007 | Hong et al. | | 345/442 |
| 2007/0091094 A1 * | 4/2007 | Hong et al. | | 345/474 |
| 2007/0216657 A1 * | 9/2007 | Konicek | | 345/173 |
| 2007/0216658 A1 * | 9/2007 | Rainisto | | 345/173 |

(Continued)

FOREIGN PATENT DOCUMENTS

JP  2005321869 A  11/2005

OTHER PUBLICATIONS

Fang Wang, Xiang Cao, Xiangshi Ren and Pourang Irani_Detecting and Leveraging Finger Orientation for Interaction with Direct-Touch Surfaces_Dated Oct. 4, 2009_10 pages.

(Continued)

*Primary Examiner* — Kumar Patel
*Assistant Examiner* — Sejoon Ahn
(74) *Attorney, Agent, or Firm* — Morgan, Lewis & Bockius LLP

(57) ABSTRACT

A method includes scanning touch sensors to obtain sensor readings; performing jump detection on the sensor readings; and if a jump is detected, calculating at least one virtual position from the sensor readings using a distance to coordinates the precede those of the detected jump.

11 Claims, 20 Drawing Sheets

(56) References Cited

U.S. PATENT DOCUMENTS

| | | | |
|---|---|---|---|
| 2007/0268269 A1* | 11/2007 | Chang et al. | 345/173 |
| 2007/0288194 A1* | 12/2007 | Boillot | 702/150 |
| 2008/0106523 A1* | 5/2008 | Conrad | 345/173 |
| 2008/0158175 A1* | 7/2008 | Hotelling et al. | 345/173 |
| 2008/0252645 A1* | 10/2008 | Mouilleseaux et al. | 345/442 |
| 2008/0284755 A1* | 11/2008 | Hardie-Bick | 345/177 |
| 2008/0297485 A1* | 12/2008 | Park | 345/173 |
| 2009/0085846 A1* | 4/2009 | Cho et al. | 345/87 |
| 2009/0174675 A1 | 7/2009 | Gillespie et al. | |
| 2009/0207148 A1* | 8/2009 | Sugimoto et al. | 345/173 |
| 2009/0296106 A1* | 12/2009 | Donaldson | 358/1.9 |
| 2010/0039396 A1* | 2/2010 | Ho et al. | 345/173 |
| 2010/0050134 A1* | 2/2010 | Clarkson | 715/863 |
| 2010/0073318 A1* | 3/2010 | Hu et al. | 345/174 |
| 2010/0097342 A1* | 4/2010 | Simmons et al. | 345/174 |
| 2010/0107099 A1* | 4/2010 | Frazier et al. | 715/765 |
| 2010/0117993 A1* | 5/2010 | Kent | 345/177 |
| 2010/0182260 A1* | 7/2010 | Kiyuna | 345/173 |
| 2010/0220063 A1* | 9/2010 | Fei | 345/173 |
| 2010/0245286 A1 | 9/2010 | Parker | |
| 2010/0265208 A1 | 10/2010 | Kim et al. | |
| 2010/0289756 A1* | 11/2010 | Anzures et al. | 345/173 |
| 2010/0289759 A1* | 11/2010 | Fisher et al. | 345/173 |
| 2010/0289826 A1* | 11/2010 | Park et al. | 345/676 |
| 2010/0315352 A1* | 12/2010 | Hamamura et al. | 345/173 |
| 2010/0315365 A1* | 12/2010 | Ohta | 345/173 |
| 2011/0007034 A1* | 1/2011 | Jorgensen | 345/178 |
| 2011/0037709 A1* | 2/2011 | Cottarel et al. | 345/173 |
| 2011/0037727 A1* | 2/2011 | Lee et al. | 345/174 |
| 2011/0061029 A1 | 3/2011 | Yeh et al. | |
| 2011/0084929 A1 | 4/2011 | Chang et al. | |
| 2011/0096011 A1* | 4/2011 | Suzuki | 345/173 |
| 2011/0102349 A1* | 5/2011 | Harris | 345/173 |
| 2011/0102464 A1* | 5/2011 | Godavari | 345/650 |
| 2011/0157048 A1* | 6/2011 | Nakatani | 345/173 |
| 2011/0163984 A1* | 7/2011 | Aono | 345/173 |
| 2011/0205169 A1* | 8/2011 | Yasutake | 345/173 |
| 2011/0260829 A1* | 10/2011 | Lee | 340/5.51 |
| 2011/0304573 A1* | 12/2011 | Smith | 345/173 |
| 2012/0007821 A1* | 1/2012 | Zaliva | 345/173 |
| 2012/0013463 A1* | 1/2012 | Higashi et al. | 340/540 |
| 2012/0127131 A1* | 5/2012 | Jung et al. | 345/178 |
| 2012/0154324 A1* | 6/2012 | Wright et al. | 345/174 |
| 2012/0182257 A1* | 7/2012 | Yamamoto et al. | 345/174 |
| 2012/0194444 A1* | 8/2012 | Chang et al. | 345/173 |
| 2012/0223894 A1* | 9/2012 | Zhao et al. | 345/173 |
| 2012/0223895 A1* | 9/2012 | Lu et al. | 345/173 |
| 2012/0242581 A1* | 9/2012 | Laubach | 345/168 |
| 2012/0313882 A1* | 12/2012 | Aubauer et al. | 345/174 |
| 2013/0021272 A1* | 1/2013 | Wang | 345/173 |
| 2013/0027581 A1* | 1/2013 | Price | H04N 5/2353 348/229.1 |
| 2013/0120279 A1* | 5/2013 | Plichta et al. | 345/173 |
| 2013/0120280 A1* | 5/2013 | Kukulski | 345/173 |
| 2013/0201147 A1* | 8/2013 | Paulsen et al. | 345/174 |
| 2013/0300704 A1* | 11/2013 | Takahashi et al. | 345/173 |
| 2014/0035849 A1* | 2/2014 | Jung et al. | 345/173 |
| 2015/0097795 A1* | 4/2015 | Lisseman et al. | 345/173 |
| 2015/0113483 A1* | 4/2015 | Van Der Westhuizen | G06F 3/04812 715/850 |
| 2015/0293676 A1* | 10/2015 | Avrahami | G06F 3/04847 715/720 |
| 2015/0309660 A1* | 10/2015 | Lee | G06F 3/0418 345/174 |

OTHER PUBLICATIONS

Jacob O. Wobbrock, Brad A. Myers, John A. Kombel_EdgeWrite: A Stylue-Based Text Entry Method Designed for High Accuracy and Stability of Motion_Dated 2003_10 pages.

Search Report for U.S. Appl. No. 13/428,721, Dated Mar. 2012, 12 pages.

* cited by examiner

| 72 | 73 | 74 | 75 | 76 | 77 | 78 | 79 | 80 |
|---|---|---|---|---|---|---|---|---|
| 63 | 64 | 65 | 66 | 67 | 68 | 69 | 70 | 71 |
| 54 | 55 | 56 | 57 | 58 | 59 | 60 | 61 | 62 |
| 45 | 46 | 47 | 48 | 49 | 50 | 51 | 52 | 53 |
| 36 | 37 | 38   43 | 39   12   11 | 40   14   14 | 41   54 | 42 | 43 | 44 |
| 27 | 28   10 | 29   14   16 | 30   50   51 | 31   52   50 | 32   43   42 | 33   22 | 34 | 35 |
| 18 | 19 | 20   87 | 21   35   34 | 22   52   51 | 23   39   37 | 24   32 | 25 | 26 |
| 9 | 10 | 11 | 12   22 | 13   54 | 14   20 | 15 | 16 | 17 |
| 0 | 1 | 2 | 3 | 4 | 5 | 6 | 7 | 8 |

FIG. 8

ENHANCED LINEARITY OF GESTURES ON A TOUCH-SENSITIVE SURFACE

PRIORITY CLAIM

This application claims priority under 35 U.S.C. §119 to U.S. application Ser. No. 61/536,536, filed on Sep. 19, 2011, which is incorporated herein by reference in its entirety.

BACKGROUND

Capacitive sensing is a technology based on capacitive coupling that is used in many different types of sensors, including those to detect and measure touch and gestures on surfaces, proximity, position or displacement, humidity, fluid level, and acceleration. Capacitive sensing may be used as a human interface device (HID) technology, for example to replace the computer mouse. Capacitive touch sensors are used in many devices such as laptop trackpads, digital audio players, computer displays, mobile phones, mobile devices, tablets and others. Capacitive sensors are advantageous for their versatility, reliability and robustness, unique human-device interface and cost reduction over mechanical switches. Technologies such as multi-touch and gesture-based touch screens (i.e., touch pads) are also premised on capacitive sensing.

Mutual capacitive sensors have a capacitor at each intersection of each row and each column. A 12-by-16 array, for example, would have 192 independent capacitors. A voltage is applied to the rows or columns. Bringing a finger or conductive stylus near the surface of the sensor changes the local electric field which reduces the mutual capacitance. The capacitance change at every individual point on the grid can be measured to accurately determine the touch location by measuring the voltage in the other axis. Mutual capacitance allows multi-touch operation where multiple fingers, palms or styli can be accurately tracked at the same time.

Self-capacitance sensors can have the same X-Y grid as mutual capacitance sensors, but the columns and rows operate independently. With self-capacitance, the capacitive load on each column or row is measured using current sensing. This produces a stronger signal than mutual capacitance sensing, but it is unable to resolve accurately more than one finger, which results in "ghosting", or misplaced location sensing.

In some contact detection devices, such as capacitance sensing surfaces, a mismatch occurs between real finger touch position and calculated position. For example, when one or more fingers are moved in a straight line across the surface of certain touch-sensitive devices, the calculated positions may exhibit deviations (jags) from the straight line of actual motion. FIGS. 1 and 2 illustrate an example of calculated position for two fingers making straight line motion across a touch-sensitive device surface. Erroneous touch position calculations (illustrated by jags in the figures) may have undesirable effects on device operation, such as false button triggers, improper gesture recognition, and poor imaging.

Previous attempts to address this problem have involved centroid calculations. These approaches have a drawback that close-together touches have less linearity than further spaced ones. For example, a touch calculation using a 3×3 centroid matrix is illustrated in FIGS. 3 and 4. FIG. 3 shows an example calculation for a 3×3 sensor touch area and a 3×3 matrix calculation. A local maximum for the touch intensity is identified and a calculation position to assign to the touch is determined by finding an arithmetic average of touch intensity in a 3×3 matrix around the local maximum. This technique yields an accurate calculated position if the touch covers an area of up to 3×3 sensors. If the touch covers a larger area (for example, 4×4 or 5×5 sensors) then the 3×3 centroid algorithm returns an inaccurate position because it does not take into account sensor signals from outside the 3×3 calculation area. This scenario is illustrated in FIG. 4.

One approach to alleviate this problem is to use a larger centroid matrix in the position calculation. This approach however may yield an inaccurate position calculation when two or more different touches are spaced closely together. Therefore larger centroid matrices are not always useful in multi-touch applications.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

FIG. 8 illustrates an example of measuring two touch profiles using a 3×3 centroid.

DETAILED DESCRIPTION

Preliminaries

Figure 1:
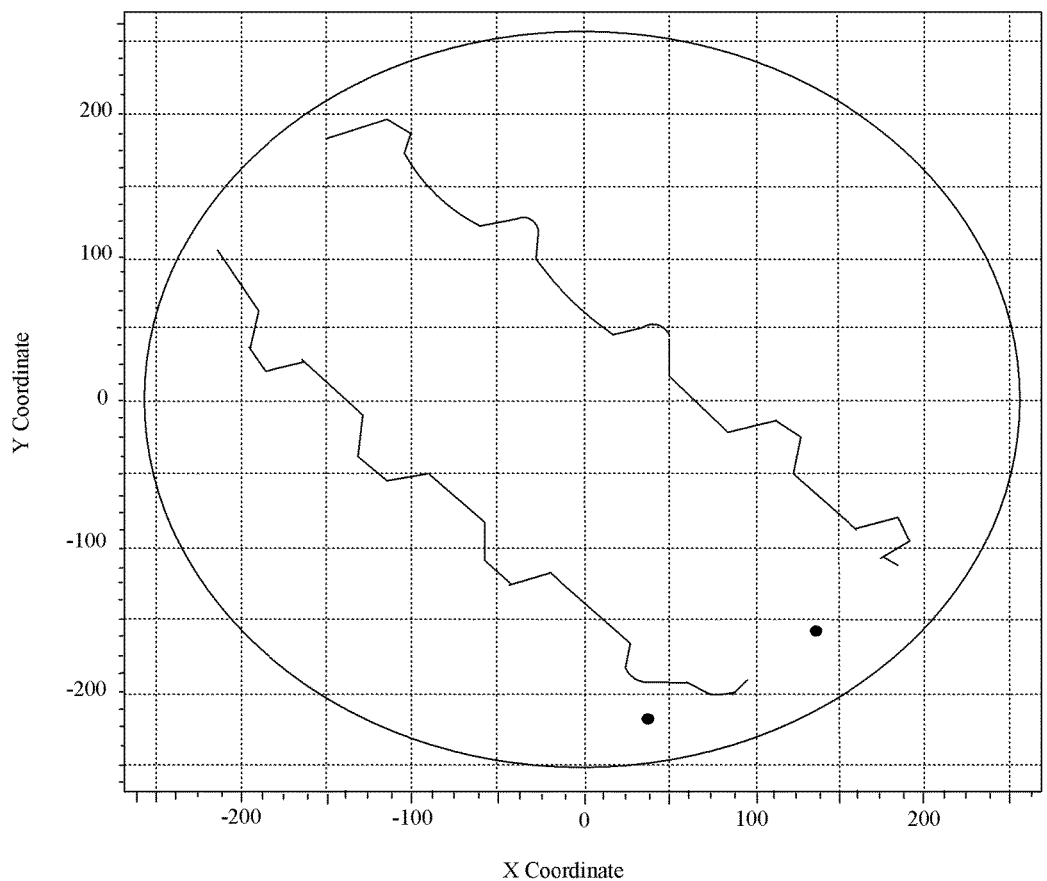
FIGS. 1 and 2 illustrate an example of calculated position for two fingers making straight line motion across a touch-sensitive device surface.
Figure 2:
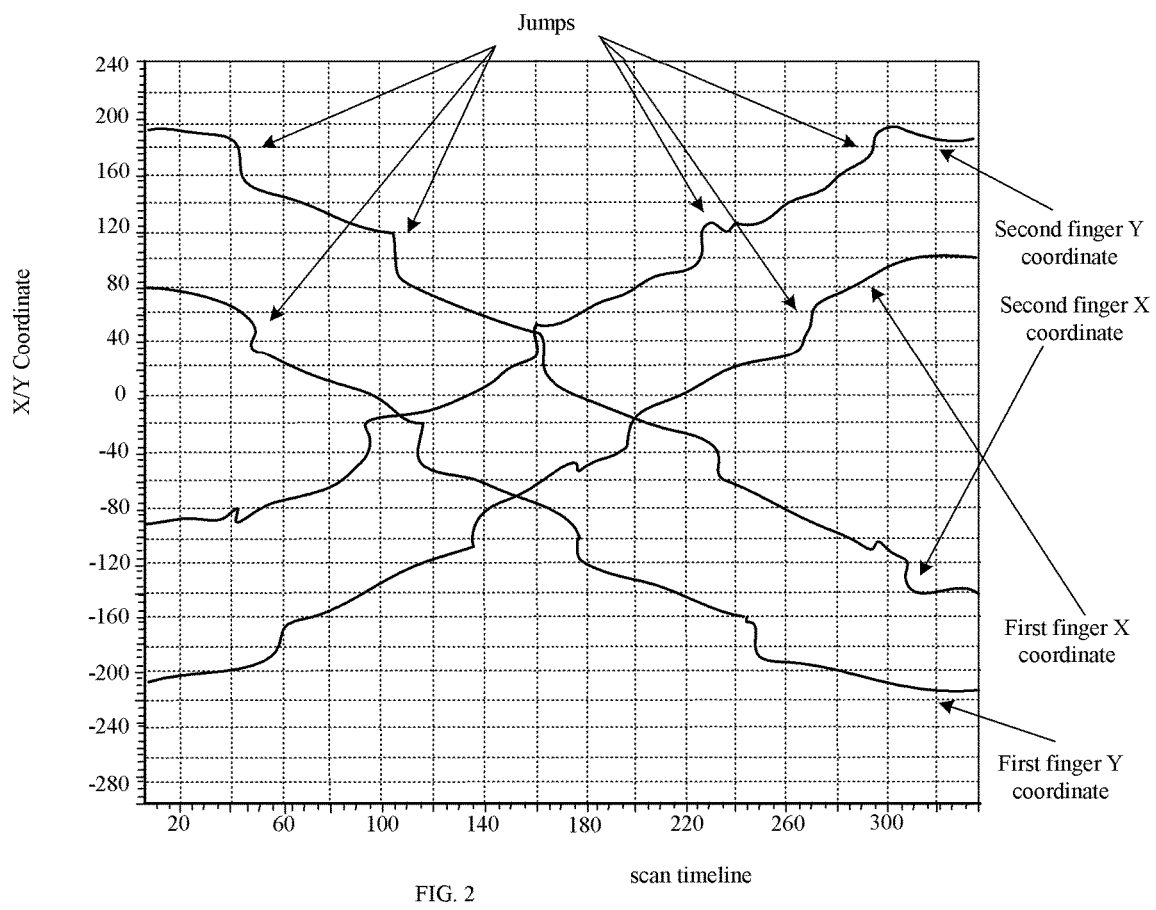
Figure 3:
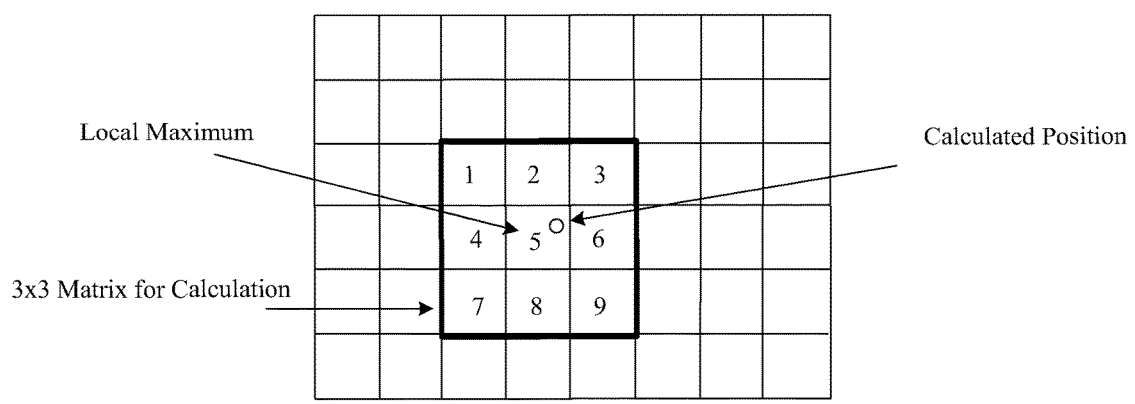
FIGS. 3 and 4 illustrate a touch calculation using a 3×3 centroid matrix.
Figure 4:
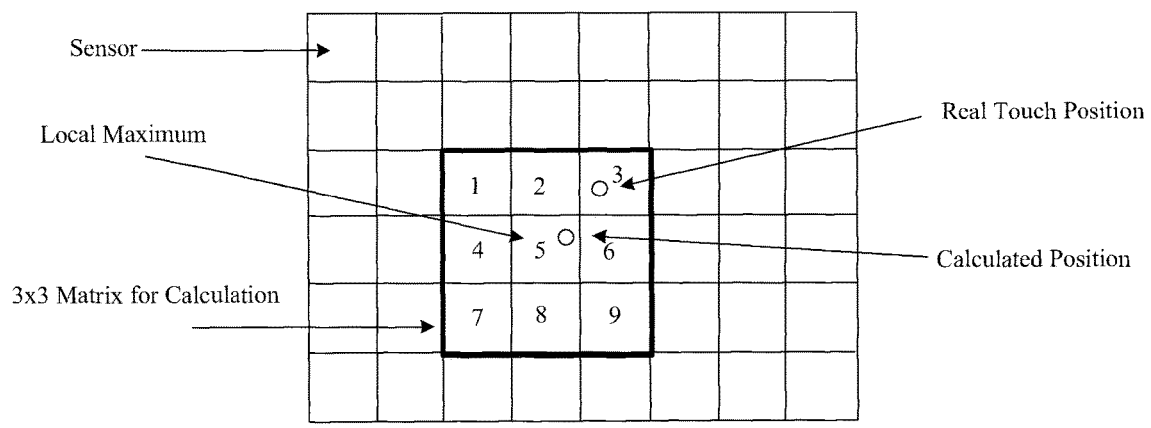

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

A "jump" refers to a deviation in position from an established motion trajectory, the deviation sufficient to trigger jump detection logic. Conditions that will trigger jump detection for certain embodiments are described herein. A "virtual position" is a calculated coordinate value that does not necessarily reflect an actual coordinate value of a touch on a touch surface.

Overview

A touch-sensitive device in configured with logic to detect position jumps at two touch movements and create new, virtual touch positions based on previous real and virtual touches. A device that includes multiple touch sensors includes logic to scan the touch sensors to obtain readings, and to perform jump detection on the readings. The device also includes logic to calculate at least one virtual position from the readings on condition that a jump is not detected (meaning, the virtual position calculation is performed only if a jump condition is not detected).

A distance test may be carried out as a first test of jump detection. The device may perform at least one center-range test as a second test of jump detection, if the distance test indicates a jump may have occurred (the distance test may indicate a jump, but not be determinative of one). A jump may be indicated as detected if one of the one or more center-range tests is consistent with a jump.

Coordinates associated with the jump may be discarded from virtual position calculation when the jump is detected. A distance may be determined from coordinates before the detected jump, and this distance may be applied to updating a virtual position. No jump may be detected if a distance determined from the distance test is less than a threshold value.

In conventional touch-sensitive applications, touch positions are defined using absolute coordinates. For example, if a touchpad has a button control at coordinates (Xb, Yb), touching these coordinates will activate the button. The approach described herein calculates virtual positions, which are relative positions. When someone touches the absolute coordinates Xb, Yb, the calculation may provide other coordinates, and the button control won't be activated.

Gestures such as Zoom and Rotate are defined by relative parameters, not absolute ones. For example, to determine Zoom when two fingers approach or move apart from one other, the difference between sequential measured positions is applied, not absolute position values. For gestures determined from relative positions/differences in position, the described approach may be advantageous in some situations.

These and other features of a touch-sensing device, circuit, and process are described in more detail below.

Detailed Description of Exemplary Embodiments

Figure 5:
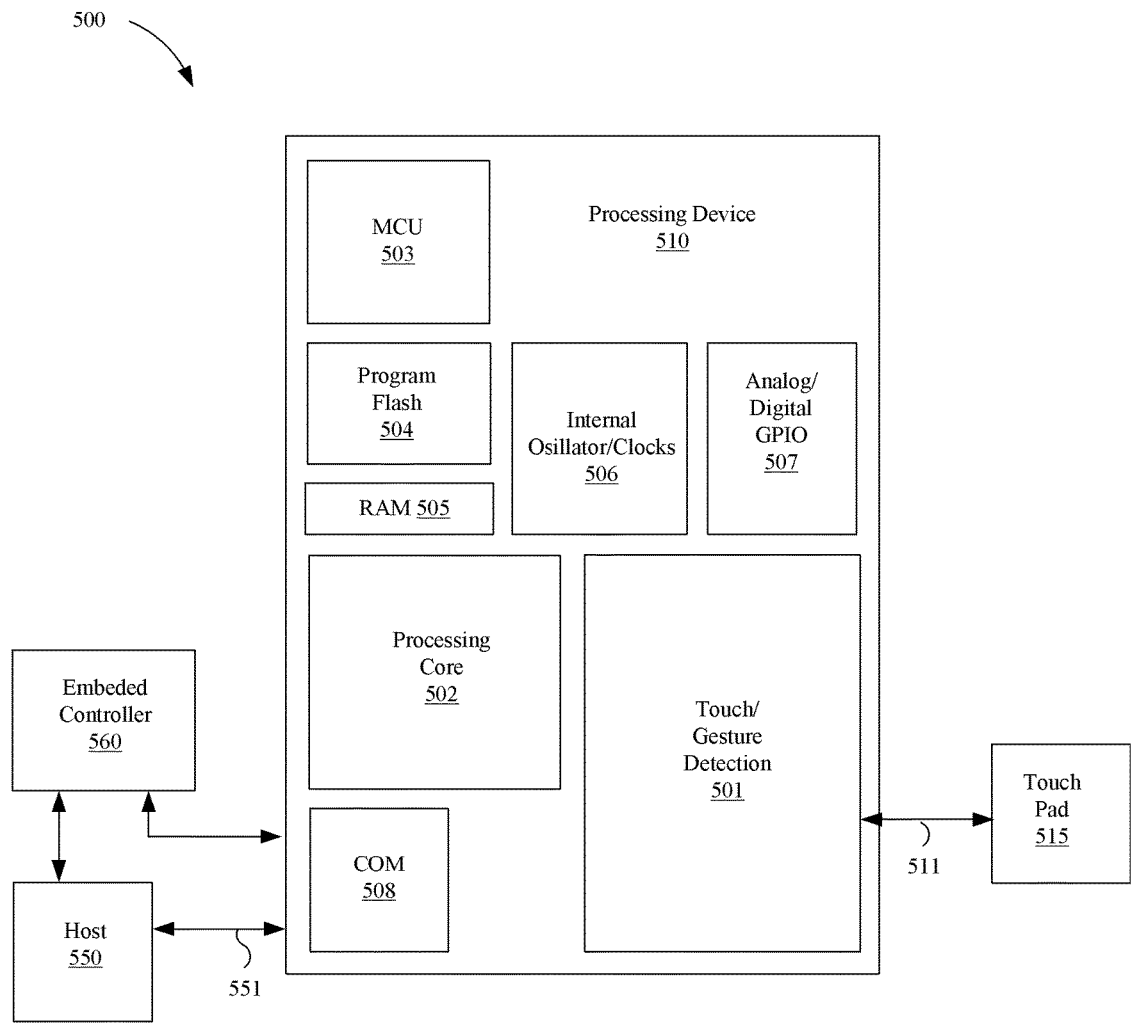
FIG. 5 illustrates a block diagram of one embodiment of an electronic system having a processing device for recognizing a touch or gesture on a touch sensor pad.

FIG. 5 illustrates a block diagram of one embodiment of an electronic system 500 having a processing device 510 for recognizing a touch or gesture on a touch-sensor pad 515. Each component of the system may be implemented by logic. The electronic system 500 includes a processing device 510, a touch-sensor pad 515, a host processor 550, and an embedded controller 560. Although several components are shown and described, some embodiments of the electronic system 500 may include fewer or more components than are illustrated in FIG. 1.

The processing device 510 may include analog and/or digital general purpose input/output (GPIO) ports 507 such as programmable GPIO ports. The GPIO ports 507 may be coupled to a programmable interconnect and logic (PIL) component (implicit), which acts as an interconnect between the GPIO ports 507 and a digital block array (not shown) of the processing device 510. In one embodiment, the digital block array may be configured to implement a variety of digital logic circuits (e.g., DAC, digital filters, digital control systems, etc.) using configurable user modules (UMs). Additionally, the digital block array may be coupled to an internal system bus (not shown).

The processing device 510 also may include memory such as random access memory (RAM) 505 and program flash 504. In one embodiment, the RAM 505 may be static RAM (SRAM), and the program flash 504 may be non-volatile data storage, which may be used to store firmware (e.g., control algorithms executable by processing core 502 to implement some or all of the operations described herein). The processing device 510 also may include a memory controller unit (MCU) 503 coupled to the memory 504 and 505 and the processing core 502.

The processing device 510 also may include an analog block array (not illustrated), which is coupled to the system bus. The analog block array may be configured to implement a variety of analog circuits (e.g., ADC, analog filters, etc.) using configurable UMs. In one embodiment, the analog block array is coupled to the GPIO 507.

Some embodiments of the processing device 510 include one or more capacitance sensors 501 (also, capsensors 501). Each capsensor 501 may include analog UO such as pins for coupling to a component outside of the processing device 510. For example, the capsensors 501 may be coupled to the touch-sensor pad 515 and/or other devices. The capsensor 501 and processing core 502 are described in more detail below.

It should be noted that the embodiments described herein can be implemented within or used in conjunction with several types of capacitive sensing devices. For example, embodiments may be implemented in touch-sensor pads 515 for notebook computers, for lighting controls, smart phones, and so forth. Similarly, the operations described herein may be implemented in several applications, including notebook cursor operations, lighting controls (e.g., dimmers), volume control, graphic equalizer control, speed control, or other control operations benefiting from gradual adjustments or a convenient touch-sensor interface. Additionally, embodiments may be used in conjunction with non-capacitive sensing elements 570, including but not limited to pick buttons, sliders (e.g., display brightness and contrast), scroll-wheels, multi-media controls (e.g., volume, track advance, etc.), handwriting recognition, and numeric keypad operation.

The electronic system 500 includes a touch-sensor pad 515 coupled to the processing device 510 via a bus 521. The touch-sensor pad 515 may include a multi-dimension sensor array, which includes sensor elements organized in two directions such as in rows and columns.

The electronic system 500 also may include non-capacitance sensor elements (not shown) coupled to the processing device 510. The non-capacitance sensor elements may include buttons, light emitting diodes (LEDs), and other user interface devices such as a mouse, a keyboard, or other functional keys that do not require capacitance sensing. The buses 551 and 521 may be a single bus or configured into any combination of one or more separate buses. The processing device 510 also may provide functionality such as keyboard control integration, LEDs, battery charger and general purpose I/O. The non-capacitance sensor elements may be coupled to the GPIO 507.

The illustrated processing device 510 also includes internal oscillator/clocks 506 and a communication block 508. The oscillator/clocks 506 provide clock signals to one or more of the components of processing device 510. The communication block 508 facilitates communications with one or more external components such as the host processor 550 via the host interface (I/F) line 551. Alternatively, the processing block 510 also may be coupled to the embedded controller 560 to communicate with the external components such as the host 550. Interfacing to the host 550 can be through various methods. In one exemplary embodiment, interfacing with the host 550 may be done using a standard PS/2 interface to connect to an embedded controller 560, which in turn sends data to the host 550 via a low pin count (LPC) interface. In some instances, it may be beneficial for the processing device 510 to do both touch-sensor pad and keyboard control operations, thereby freeing up the embedded controller 560 for other housekeeping functions. In another exemplary embodiment, interfacing may be done using a universal serial bus (USB) interface directly coupled to the host 550 via the host interface line 551. Alternatively, the processing device 510 may communicate to external components such as the host 550 using industry standard interfaces such as USB, PS/2, inter-integrated circuit (I2C) bus, or system packet interface (SPI). The host 550 and/or embedded controller 560 may be coupled to the processing device 510 with a ribbon or flex cable from an assembly which houses the touch-sensor pad 515 and processing device 510.

In one embodiment, the processing device 510 is configured to communicate with the embedded controller 560 or the host 550 to send data. The data may be a command or alternatively a signal. In an exemplary embodiment, the electronic system 500 may operate in both standard-mouse compatible and enhanced modes. The standard-mouse compatible mode utilizes the HID class drivers already built into the Operating System (OS) software of the host 550. These drivers enable the processing device 510 and sensing device to operate as a standard cursor control user interface device such as a two-button PS/2 mouse. The enhanced mode may enable additional features such as scrolling (reporting absolute position) or disabling the sensing device such as when a mouse is plugged into the notebook. Alternatively, the processing device 510 may be configured to communicate with the embedded controller 560 or the host 550 using non-OS drivers such as dedicated touch-sensor pad drivers, or other drivers known by those of ordinary skill in the art. In other words, the processing device 510 may operate to communicate data (e.g., commands or signals) using hardware, software, and/or firmware, and the data may be communicated directly to a processing device of the host 550 such as a host processor or, alternatively, may be communicated to the host 550 via drivers of the host 550, such as OS drivers or non-OS drivers. It should also be noted that the host 550 may directly communicate with the processing device 510 via the host interface 551.

In one embodiment, the data sent to the host 550 from the processing device 510 relates to commands including click, double-click, movement of the cursor, scroll-up, scroll-down, scroll-left, scroll-right, step Back, and step Forward. Alternatively, other user interface device commands may be communicated to the host 550 from the processing device 510. These commands may be based on gestures that occur on the sensing device and are recognized by the processing device 510. Exemplary gestures include tap, push, hop, and zigzag gestures. A tap gesture occurs, for example, when a conductive object (e.g., finger) is detected on the sensing device for less than a threshold time. If the time the finger is placed on the touchpad is greater than the threshold time, then the detected gesture may be considered to be a movement of the cursor in one or more directions. Scroll-up, scroll-down, scroll-left, and scroll-right, step back, and step-forward gestures may be detected when the absolute position of the conductive object is within a pre-defined area and movement of the conductive object is detected. Alternatively, other gestures may be recognized. Similarly, signals may be sent that indicate the recognition of operations related to these gestures.

In one embodiment, the processing device 510 may reside on a common carrier substrate such as an integrated circuit (IC) die substrate, a multi-chip module substrate, or the like. Alternatively, the components of the processing device 510 may be one or more separate integrated circuits and/or discrete components. In one exemplary embodiment, the processing device 510 may be a Programmable System on a Chip (PSoC™) processing device, manufactured by Cypress Semiconductor Corporation, San Jose, Calif. Alternatively, the processing device 510 may include one or more other processing devices such as a microprocessor or central processing unit, a controller, special-purpose processor, digital signal processor (DSP), an application specific integrated circuit (ASIC), a field programmable gate array (FPGA), or the like, known by those of ordinary skill in the art. In another embodiment, the processing device 510 may be a network processor having multiple processors including a core unit and multiple microengines. Additionally, the processing device 510 may include any combination of general-purpose processing device(s) and special-purpose processing device(s).

It should also be noted that the embodiments described herein are not limited to having a configuration of a processing device 510 coupled to a host 550, but may include a system that measures the capacitance on the sensing device 515 and sends the raw data to a host computer 550 where it is analyzed by an application. In other words, the processing of the raw data may be done by the processing device 510 and/or the host 550.

In one embodiment, a fully self-contained touch-sensor pad 515 is implemented which outputs fully processed x/y movement and gesture data signals or data commands to a host 550. In another embodiment, a touch-sensor pad 515 is implemented which outputs x/y movement data and also finger presence data to a host 550, and the host 550 processes the received data to detect gestures. In another embodiment, the a touch-sensor pad 515 is implemented which outputs raw capacitance data to a host 550, and the host 550 processes the capacitance data to compensate for quiescent and stray capacitance, as well as calculates x/y movement and detects gestures by processing the capacitance data. In another embodiment, a touch-sensor pad 515 is implemented which processes and outputs capacitance data to compensate for quiescent and stray capacitance to a host 550, and the host 550 calculates x/y movement and detects gestures from the pre-processed capacitance data.

In one embodiment, the electronic system 500 implements a conventional laptop touch-sensor pad 515. Alternatively, the electronic system 500 may be implemented in a wired or wireless keyboard with an integrated touch-sensor pad 515, which is connected to a host 550 via the wired or wireless connection. In such an implementation, the processing described above as being performed by the "host" may be performed in part or in whole by the keyboard controller, which may then pass fully processed, pre-processed or unprocessed data to the system host 550. In another embodiment, the electronic system 500 may be a mobile handset (e.g., cell phone) or other electronic device having a touch-sensor pad 515 which operates in two or more modes. For example, the touch-sensor pad 515 may operate either as a touch-sensor pad 515 for x/y positioning and gesture recognition, or as a keypad or other array of touch-sensor buttons and/or sliders. In other words, a touch-sensor pad 515 may implement touch-sensor buttons and/or sliders at the same time on different areas of the pad 515 or at different times in the same area of the pad 515. The electronic system 500 may be a mobile handset, a personal data assistant (PDA), a television, a remote control, a monitor, a handheld multi-media device, a handheld video player, a handheld gaming device, a control panel, or another type of device.

The capacitance sensor 501 may be integrated into the IC of the processing device 510, or alternatively, in a separate IC. Alternatively, embodiments of the capacitance sensor 501 may be incorporated into other integrated circuits. For example, behavioral level code describing the capacitance sensor 501, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe the capacitance sensor 501.

In one embodiment, capacitance sensor 501 is a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The switch array may include combinations of independent switches, sliding switches, and touch-sensor pads 515 implemented as a pair of orthogonal sliding switches. The CSR may include physical, electrical, and software components. The physical component may include the physical switch itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a switch detection decision. For example, in the case of slide switches 530 or x/y touch-sensor pads 515, the software may calculate a position of the conductive object to greater resolution than the physical pitch of the switches.

It should be noted that there are various known methods for measuring capacitance. The present embodiments are not limited to using relaxation oscillators, but may include other methods, such as current versus voltage phase shift measurement, resistor-capacitor charge timing, capacitive bridge divider, or charge transfer.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in the processing device 510. The charge transfer may be conceptually similar to an R-C charging circuit. In this method, $C_p$ is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 6:
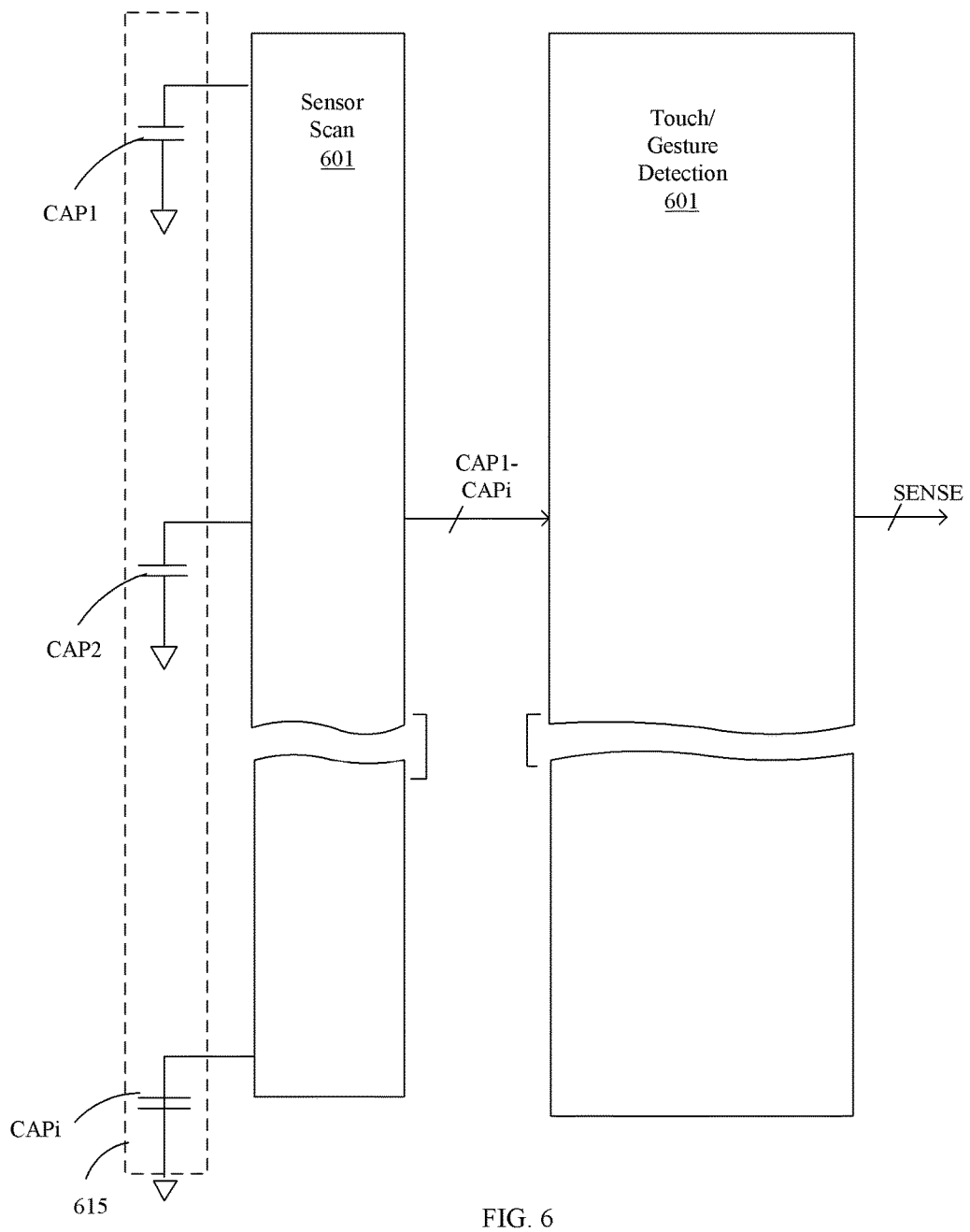
FIG. 6 illustrates an embodiment of touch panel scan and initialization logic.

FIG. 6 illustrates an embodiment of touch pad scan and initialization logic. Scan logic 601 measures each of multiple capacitors (CAP1 . . . CAPi) of the touch pad 615. The measurements may be taken sequentially, or fully or partially in parallel. Each measurement is provided to touch/gesture detection logic 601, which may also operate the scan logic 601 to control the timing and procedure of the sensor scan. The touch/gesture logic 601 analyzes the measurements and produces a SENSE signal indicative of a touch and/or gesture.

Figure 7:
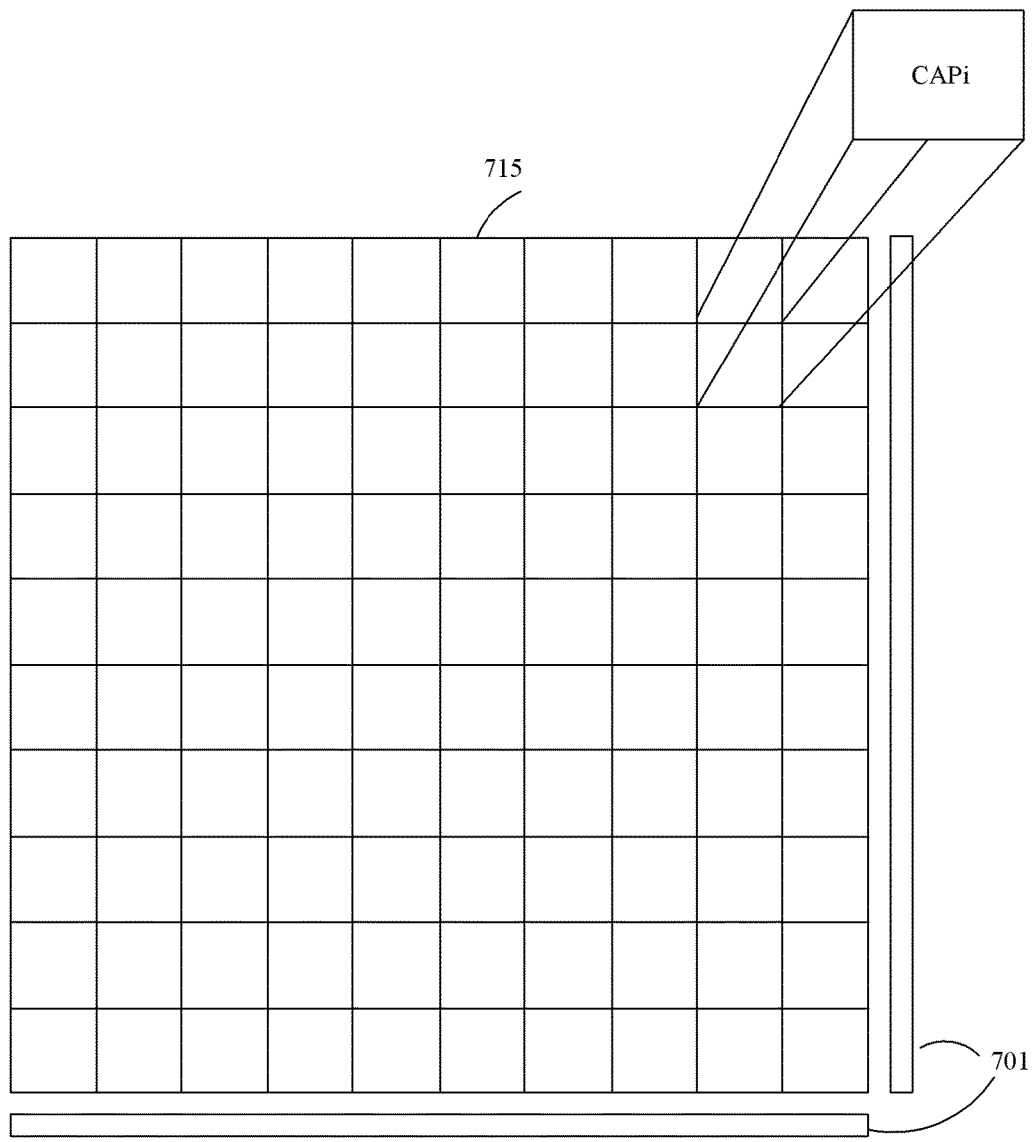
FIG. 7 illustrates an embodiment of touch pad logic.

FIG. 7 illustrates an embodiment of touch pad logic. A plurality of capacitors (CAPi) are arranged in a touch pad grid 715. A particular capacitor of the grid 715 is addressable for purposes of measurement via row and column logic 701. Details of implementing embodiments of the touch pad 715, capacitors CAPi, and row/column address logic 701 are known in the art.

In one embodiment, for each touch, two scans are made, each resulting in a touch intensity measurement for multiple sensors. Each scan results in a "measurement profile" for a group of sensors. FIG. 8 illustrates an example of measuring two touch profiles using a 3×3 centroid. Each box in the figure is a sensor that can be independently measured for touch intensity. The touch position (which is also the sensor/ box number) is the first number (from top left) in a box. The second number in a box, from top left, is the measured touch intensity for the first measurement scan. The third number in a box, from top left, is the measured touch intensity for the second measurement scan.

Two scans are made, each one yielding a measurement for each sensor. In one embodiment, the difference in measurements between the first and second scans is around two points for each sensor, because the system is designed with a scan rate that is very fast in comparison to the speed of movement of the touching object. The faster is the movement of the touching object, or the slower the scan speed, the greater the potential difference in corresponding sensor measurements between two consecutive scans.

A 3×3 centroid calculation for the first scan yields a local maximum at the $31^{st}$ sensor. The local maximum is the sensor measurement which has largest value in the 3*3 centroid calculation area. When there are two or more touches, there are several local maximums. If two neighbor sensors have the same signal value, both equal to the local maximum, then one of these sensors will be selected for the local maximum (implementation specific).

A 3×3 centroid calculation for the second scan yields a local maximum at the $30^{th}$ sensor. The first centroid calculation takes into account signals from the $32^{nd}$ sensor ($23^{rd}$ and $41^{st}$ also) but does not take into account signals from the $29^{th}$ sensor (nor from the $20^{th}$ and $38^{th}$). The second centroid calculation does not take into account signals from the $32^{nd}$ sensor (nor the $23^{rd}$ and $41^{st}$) but does take into account signals from the $29^{th}$ sensor (and from the $20^{th}$ and $38^{th}$). "Position jumps" are detected when either the touch covers an area bigger than 3×3 sensors, or the local maximum of touch changes from one cell to other one. Finger motion is smooth enough and slow enough compared to the measurement rate that jumps may be detected effectively.

Figure 9:
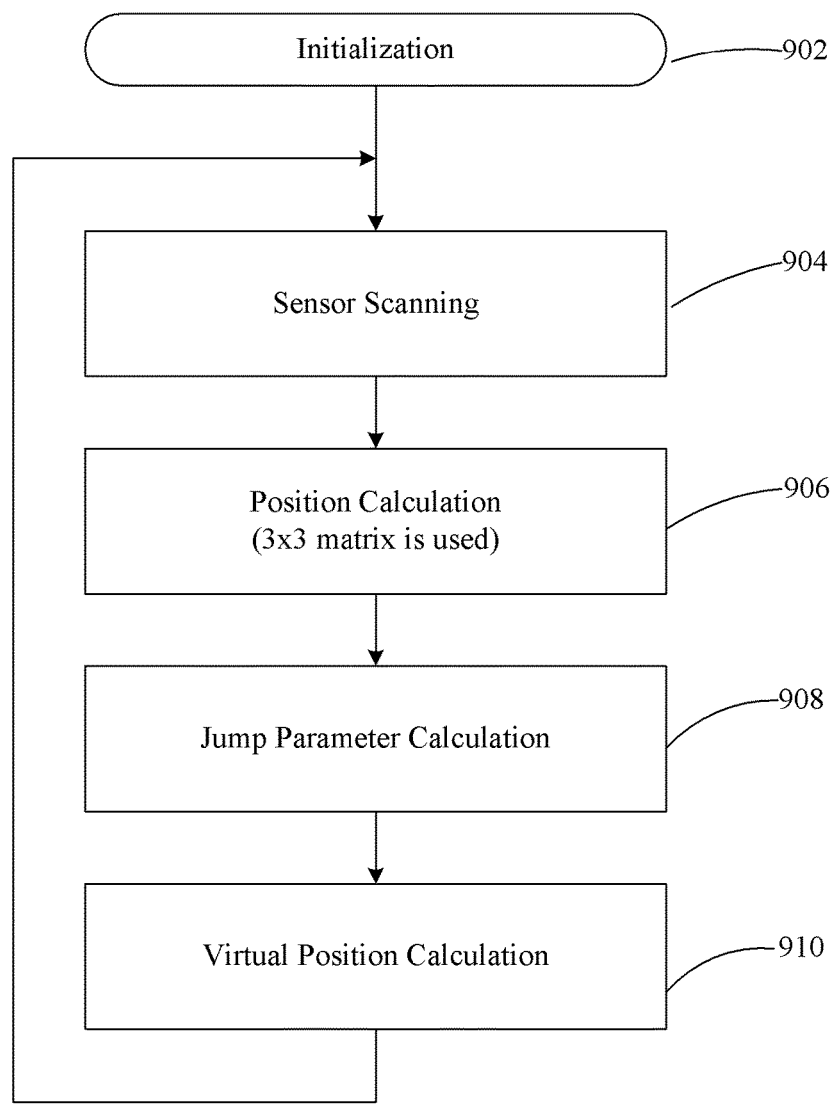
FIG. 9 illustrates an embodiment of general process of determining virtual positions of a touch event.

FIG. 9 illustrates an embodiment of general process of determining virtual positions of a touch event. After an initialization 902 a scan of the sensors is made (904). Typically, all the sensors on a touch surface are measured during each scan. Two or more scans are made. Position calculations for the scanned measurements are made (906). Jumps are determined (908). One or more virtual positions are calculated (910). The manner in which the virtual positions are calculated depends on the jump determination.

In one embodiment, motion parameters such as velocity, acceleration, zoom, and angle are specifically excluded from the jump and virtual position calculations. Zoom is the distance between two active gestures (how they are moving together or apart). Angle is an angle between a selected axis and a line defined by multiple touch locations. Instead, only differences between two neighbor positions of the same touch (current and previous positions) are used for the calculations. The detected jumps occur within each touch separately. Each touch is analyzed for jumps independently from the others.

Initially, calculated touch positions are saved as new virtual positions. Each subsequent scan yields new calculated positions. A difference between two calculated positions (current and previous calculated positions) is determined, checked, and added to the virtual position. If there's no jump then the measured position and virtual position shift by the same amount. If a jump occurs then detected and virtual positions may differ. Depending on the jump determination results, the virtual position is updated differently. In one case the difference between the current and previous scan measurements are added; in other case the difference between the previous and pre-previous scan measurements are added.

Figure 10:
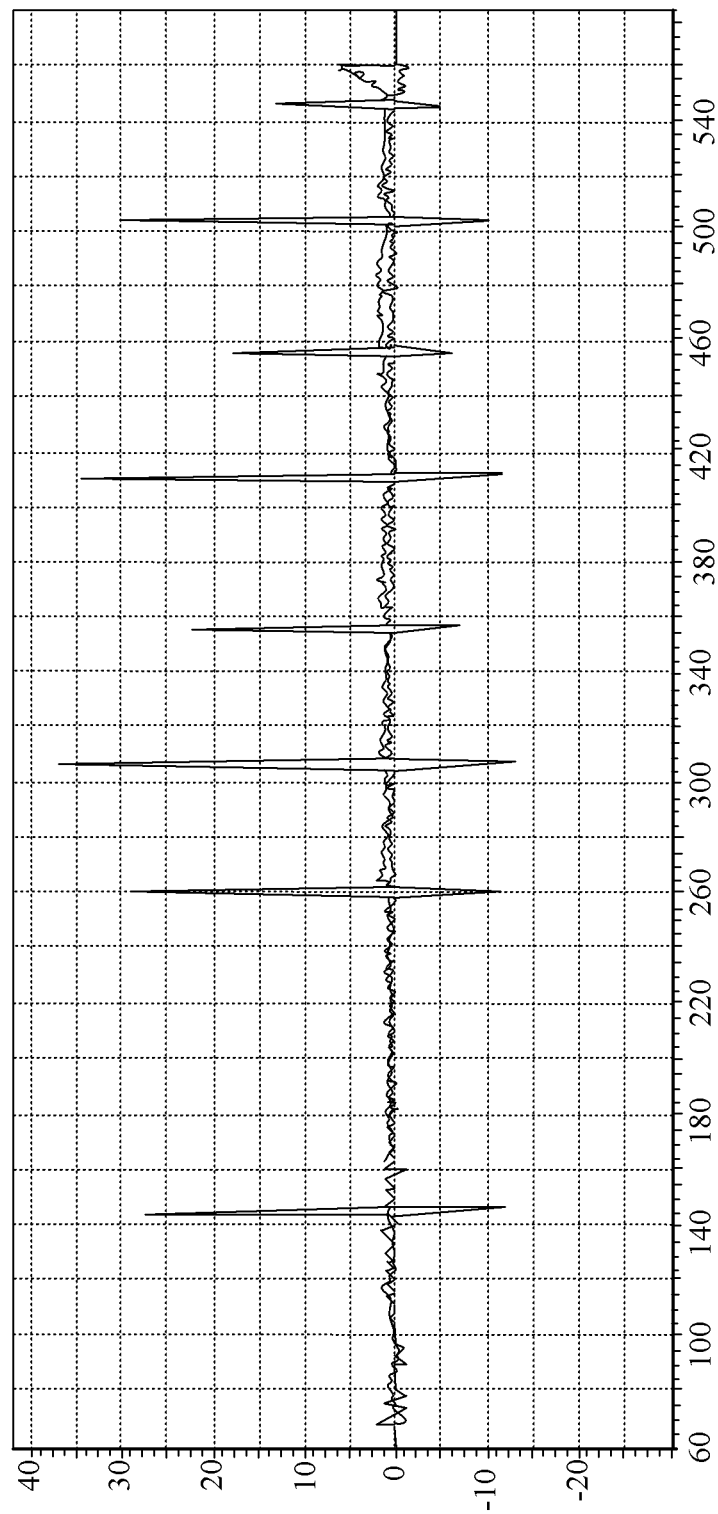
FIG. 10 illustrates differences in position between two sequential sensor scans.

FIG. 10 illustrates differences in contiguous X and Y coordinate measurements for two sensor scans. Each graph peak is indicative of a jump. The horizontal axis is the scan timeline. The vertical axis is a difference in coordinates between two contiguous scans.

Figure 11:
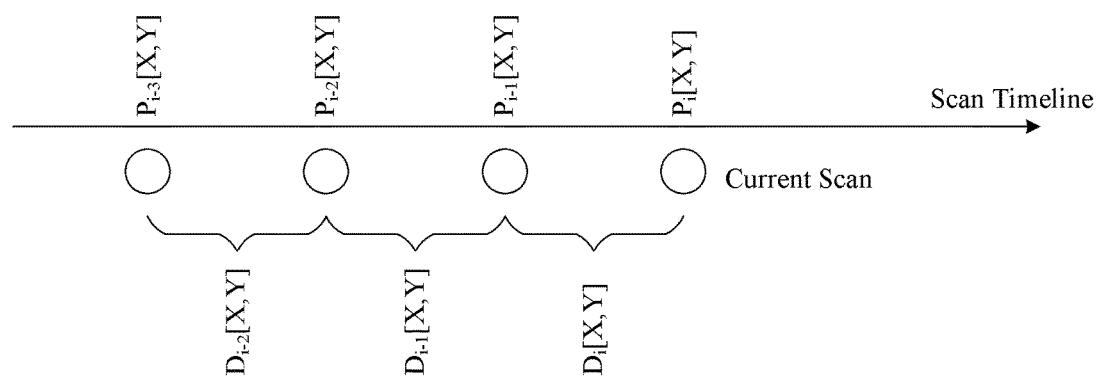
FIG. 11 illustrates a technique for determining a distance between a current and previous touch positions.

A jump may be detected as follows. Touch positions are first calculated, in one embodiment, using a 3*3 centroid algorithm. Each scan at finger touch returns X and Y coordinates $P_i[X,Y]$. A distance between a current and previous touch position is determined. (e.g., as shown in FIG. 11). Let $D_i[X,Y]$ be a distance calculation as follows:

$$D_i(X)=P_i(X)-P_{i-1}(X) \quad (1)$$

$$D_i(Y)=P_i(Y)-P_{i-1}(Y) \quad (2)$$

Figure 12:
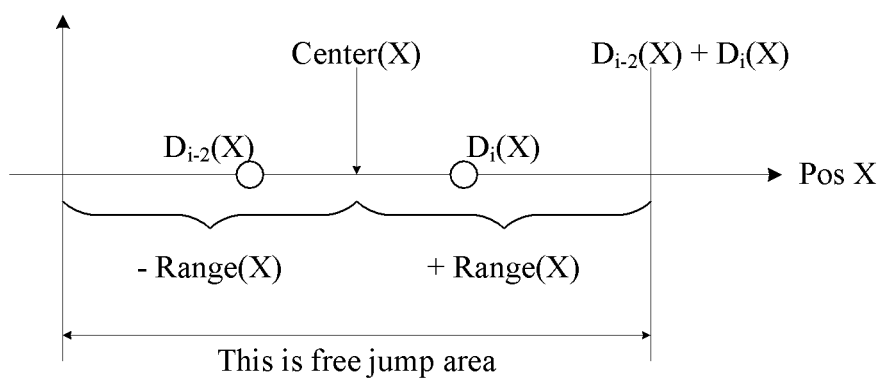
FIG. 12 illustrates a technique for jump detection excluding velocity and acceleration data.

Jump detection may be determined excluding velocity and acceleration data using a technique such as the embodiment illustrated in FIG. 12. Center(X) is determined as the arithmetic average of the two distances $D_i$ and $D_{i-2}$. Range(X) is the distance from center(X) and is the extent in which a jump cannot be detected.

$$Center(X) = (D_i(X) + D_{i-2}(X))/2 \quad (3)$$

$$Center(Y) = (D_i(Y) + D_{i-2}(Y))/2 \quad (4)$$

$$Range(X) = (|D_i(X)| + |D_{i-2}(X)|)/2 \quad (5)$$

$$Range(Y) = (|D_i(Y)| + |D_{i-2}(Y)|)/2 \quad (6)$$

Under the following conditions, $D_{i-1}$ is out of range:

$$D_{x-1}(X)>(Center(X)+Range(X)) \quad (7)$$

$$D_{x-1}(X)<(Center(X)-Range(X)) \quad (8)$$

$$D_{x-1}(Y)>(Center(Y)+Range(Y)) \quad (9)$$

$$D_{x-1}(Y)<(Center(Y)-Range(Y)) \quad (10)$$

If at least one of the above conditions is true then a jump is detected. An additional condition may be used to eliminate false jump detection when the finger or other touch surface is "slow-moving". Each measurement has some noise. This noise causes some bounce of positions. A threshold parameter may be defined (e.g., 4). When distance between two positions is small and not higher than the threshold number of position units, a jump won't be detected. The value selected for the threshold parameter may vary according to expected or detected noise levels.

$$|D_{x-1}(X)|>4 \quad (11)$$

If distance is less than a threshold value (e.g., 4) then all above conditions are moot and a jump cannot be detected. The above procedure is repeated for each coordinate, X and Y.

Figure 13:
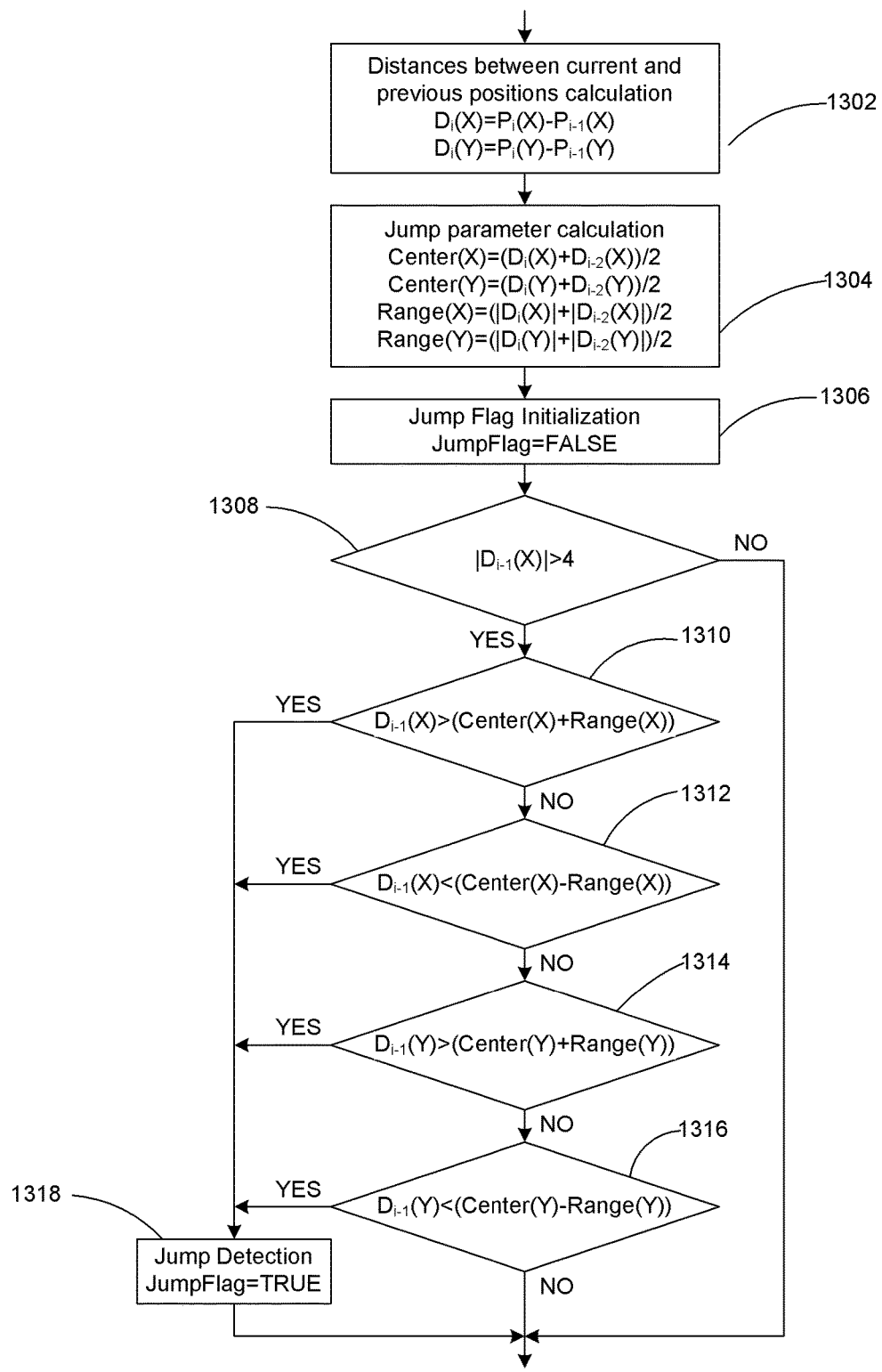
FIG. 13 illustrates an embodiment of a jump detection process.

FIG. 13 illustrates an embodiment of jump detection. At 1302 a distance is calculated between current and previous positions. The Center and Range parameters are determined at 1304. At 1306 the jump flag is set FALSE. A distance test is performed at 1308. If the distance test succeeds (i.e. indicates that a jump may have occurred), the Center-Range tests are carried out at 1310-1316. If any of the tests 1310-1316 succeeds, the jump flag is set TRUE, indicating a jump is detected.

If a jump is not detected (jump flag=FALSE), the same difference (distance between both neighbor positions by X and by Y) is applied to virtual position.

$$VP_i[X, Y] = VP_{i-1}[X, Y] + D_{i-1}[X, Y] \tag{12}$$

Otherwise, if a jump is detected, a difference from two scans previous is applied to virtual positions.

$$VP_i[X, Y] = VP_{i-1}[X, Y] + D_{i-2}[X, Y] \tag{13}$$

Figure 14:
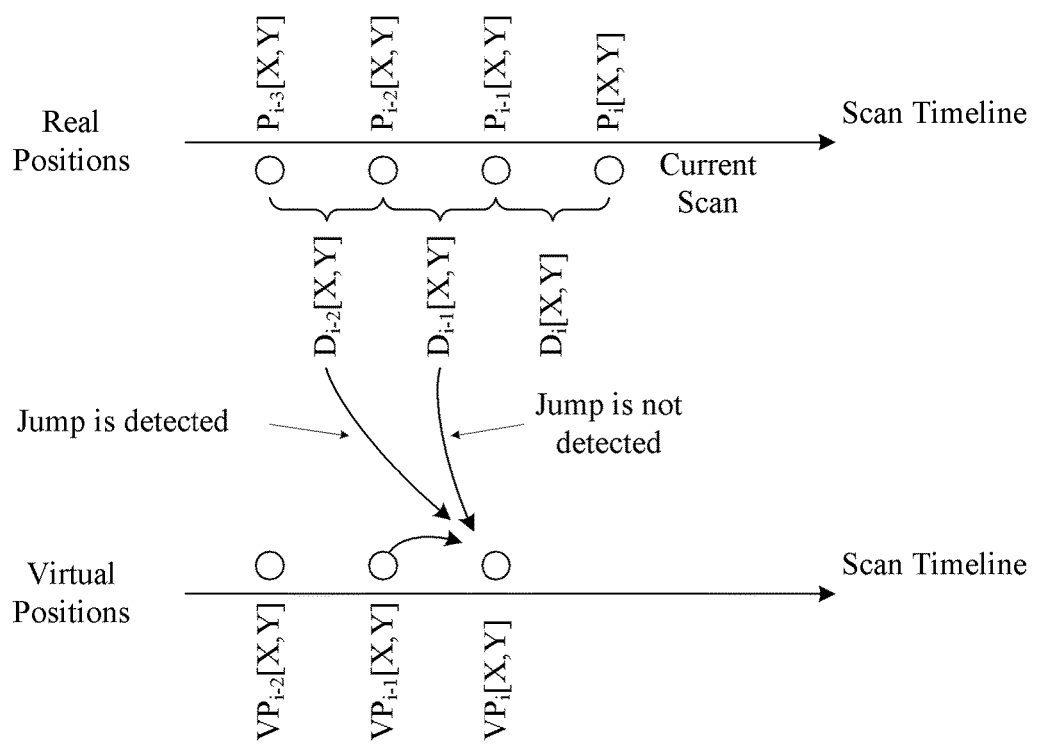
FIGS. 14 and 15 illustrate an embodiment of virtual position calculation.
Figure 15:
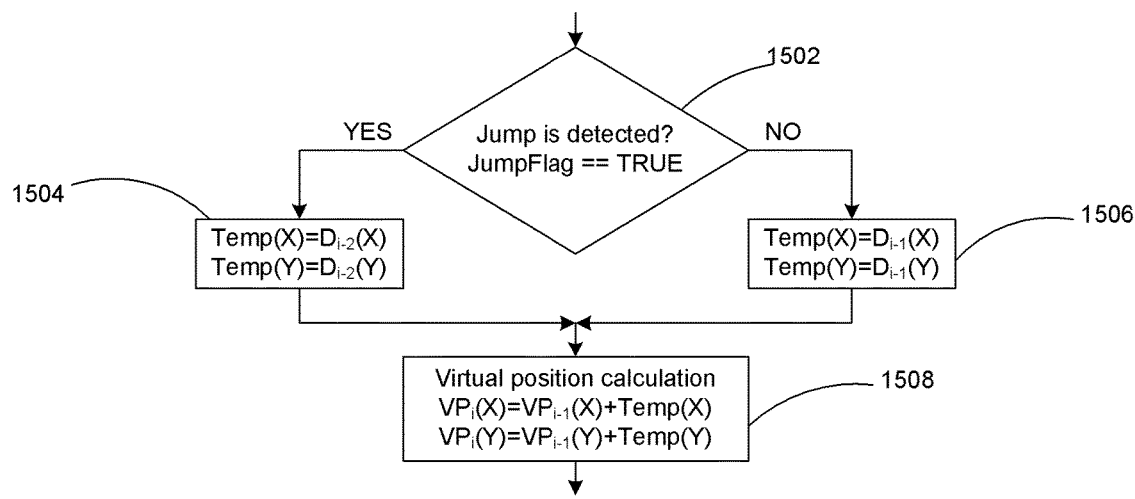

FIGS. 14 and 15 illustrate an embodiment of virtual position calculation. Referring to FIG. 15, if a jump is detected at 1502, the increment values (Temp(X) and Temp(Y)) are set according to 1504:

$$\text{Temp}(X) = D_{i-2}(X)$$

$$\text{Temp}(Y) = D_{i-2}(Y)$$

Otherwise, if a jump is not detected, the increment values (Temp(X) and Temp(Y)) are set according to 1506:

$$\text{Temp}(X) = D_{i-1}(X)$$

$$\text{Temp}(Y) = D_{i-1}(Y)$$

At 1508 the virtual position coordinates are updated according to the increment values.

The above-described embodiments may introduce one scan delay into the processing and identification of touches to a device. However, IIR or LPF are not required, and so the total scan time will be acceptable in most cases. The effects of jumps are reduced, and calculated touch positions will more accurately correlate with the actual touch positions. The calculation algorithm is simple and requires only a small additional amount of memory and calculation time.

The calculated virtual positions may sometimes be outside the active physical area. This situation can happen when touch contact is present for a long time and many jumps are detected. However this will be acceptable in many applications. For example, the described approach may work well for detecting ZOOM and ROTATE gestures.

Figure 16:
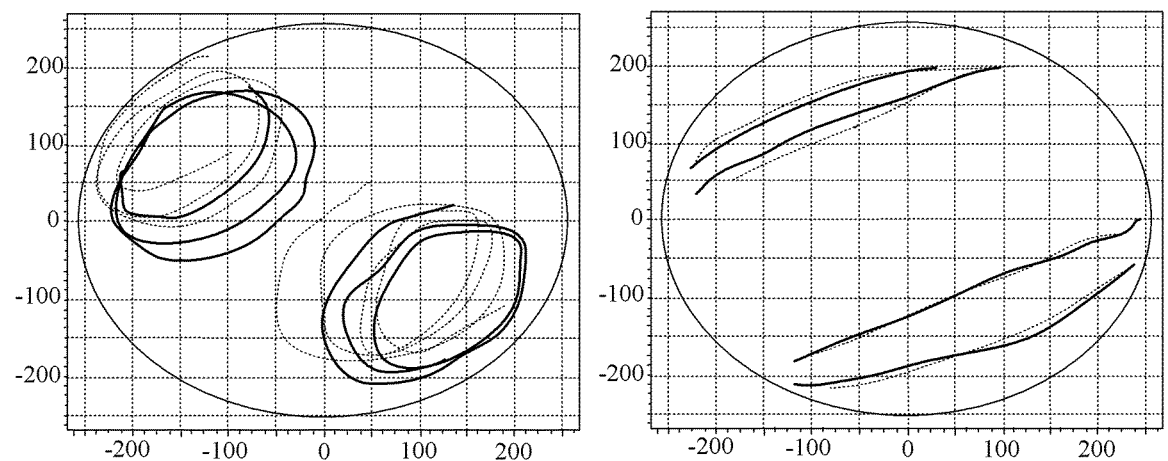
FIGS. 16-19 illustrate examples of real positions and virtual position calculations for circular and straight line finger contact over a plurality of touch sensors.
Figure 17:
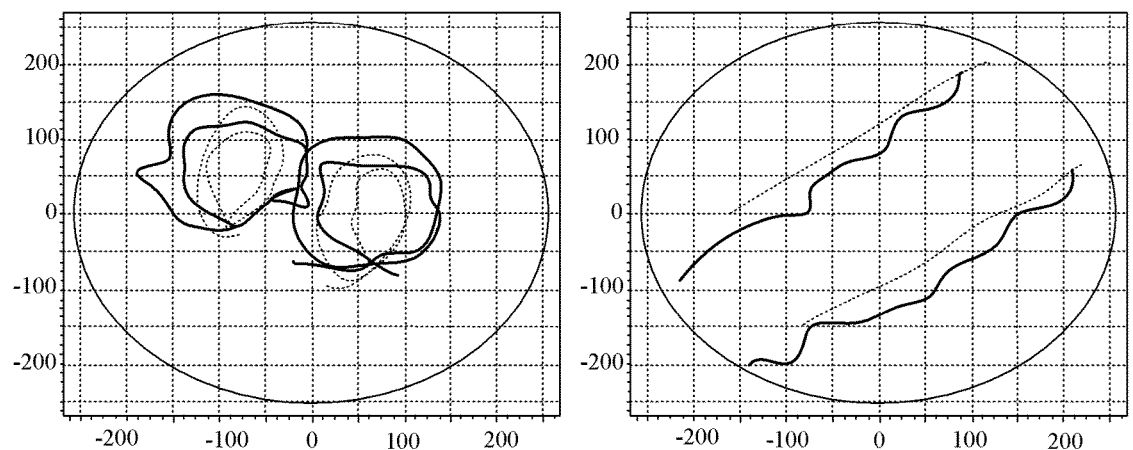
Figure 18:
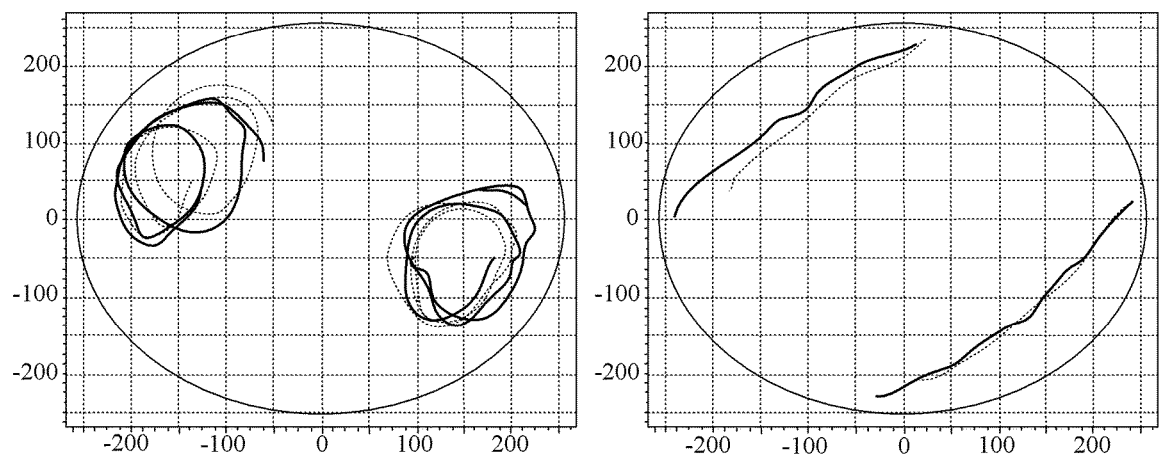
Figure 19:
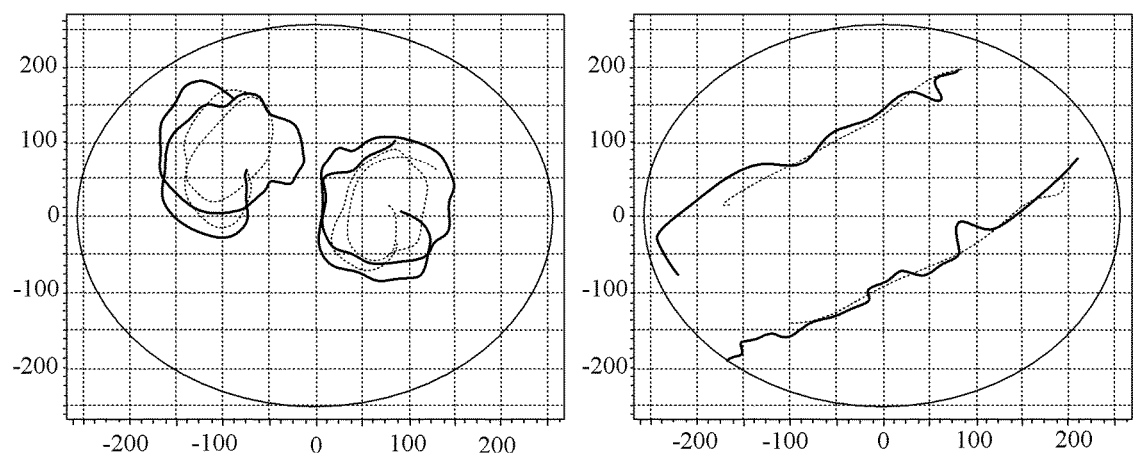

FIGS. 16-19 illustrate examples of real positions and virtual position calculations for circular and straight line finger contact over a plurality of touch sensors. Lighter dotted lines indicate virtual positions; heavier solid lines are real positions. FIG. 16 illustrates an example of fast finger movement where the distance between fingers is "far". Far touches are touches which do not overlap in terms of the sensors they affect for purposes of the described calculations. "Near" touches are touches that influence the same sensors for purposes of the described calculations. In this situation jumps appear more frequently. FIG. 17 illustrates an example of fast finger movement where the distance between fingers is near. FIG. 18 illustrates an example of slow finger movement where the distance between fingers is far. FIG. 19 illustrates an example of slow finger movement where the distance between fingers is near.

Figures 20, 21:
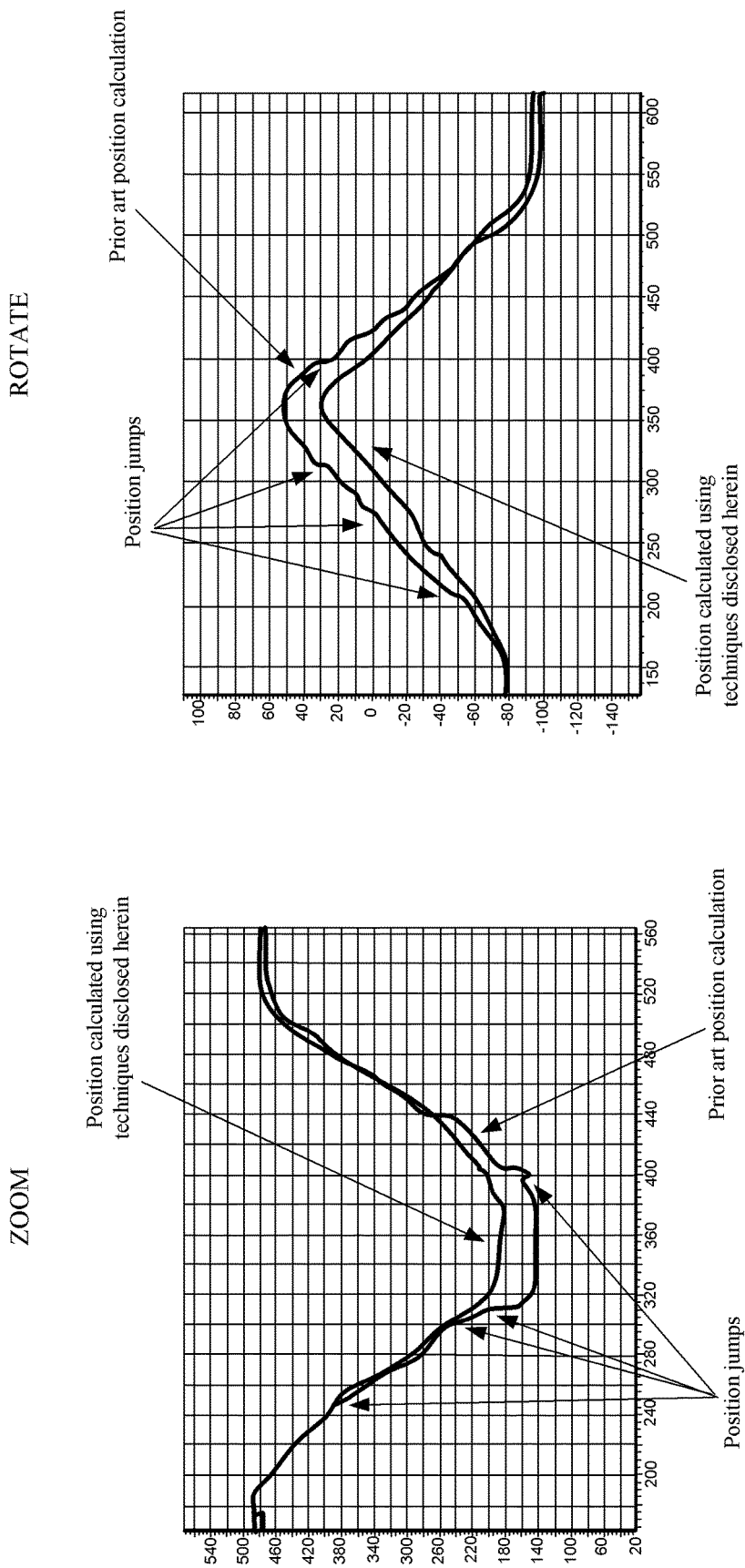
FIGS. 20 and 21 illustrate examples of real and virtual position calculation for ZOOM and ROTATE gestures.

FIGS. 20 and 21 illustrate examples of real and virtual position calculation for ZOOM and ROTATE gestures. ZOOM gesture allows to change zoom of pictures, photos, in other words scaling. For it calculation are used coordinates of two touches. Actually it is distance between two touches. The next scan provide new distance between touches. And we can compare these two distances: it was increased or decreased or wasn't changed. Based on comparison we define what we have to do with scaling. The same situation with ROTATE gesture: allows rotate a photos for example. Calculation procedure: calculate angle between two touches line and X axis and compare with previous angle.

In some embodiments that require more accurate jump detection, additional parameters may be introduced into the calculations based on movement speed, acceleration, zoom, and/or rotate factors. Filtering techniques known in the art may be added based on several last real and virtual positions. In some embodiments, a single touch detection 5×5 centroid algorithm may be used, and at two or more touches 3×3 centroid algorithm with virtual position calculation can be used. If the touch covers a larger area (for example, 4×4 or 5×5 sensors), the 3×3 centroid algorithm returns an inaccurate position because it does not take into account sensor signals from outside the 3×3 calculation area. A 5×5 centroid can solve this problem. However a 5×5 centroid does not have sufficient resolution to resolve close touches (e.g. touches that activate sensors that overlap different 5×5 areas). For example, a 5×5 centroid may be applied to single touches or touches in areas of the sensor surface that are reserved for single touch controls, such as buttons. The 5×5 centroid may be applied to button pressing, painting, so on, whereas the 3×3 centroid is used where gestures are applied, or where multiple touches are detected. Examples of where the 3×3 centroid approach described herein may be useful include zoom (change scaling), rotate (turn pages, rotate photos, etc.)

Implementations and Alternatives

The techniques and procedures described herein may be implemented via logic distributed in one or more computing devices. The particular distribution and choice of logic is a design decision that will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A touch-sensitive device, comprising:
a plurality of touch sensors; and
a logic circuit configured to:
determine a real position of a conductive object on the touch sensitive device and a corresponding virtual position of the conductive object based on scanning the plurality of touch sensors at an initial time;
scan the plurality of touch sensors at a subsequent plurality of times to obtain a plurality of sensor readings;
use the plurality of sensor readings to compare movement of the conductive object during a first time of the plurality of times to a predefined threshold distance and to compare the movement to a center range based on scans at the plurality of times other than the first time;
when the movement exceeds the predefined threshold distance and the movement falls outside of the center range, update the virtual position using a distance between first coordinates of a first scan at a first time of the plurality of times and second coordinates of a second scan at a second time of the plurality of times that precede the plurality of sensor readings; and
when the movement does not exceed the predefined threshold distance or the movement falls within the center range, update the virtual position using a distance between coordinates of the real position at times immediately preceding the first time.

2. The touch-sensitive device of claim 1, wherein the logic circuit is further configured to:
discard coordinates associated with the real position from the virtual position calculation when the movement exceeds the predefined threshold and the movement falls outside of the center range.

3. The touch-sensitive device of claim 1, wherein the logic circuit is further configured to:
apply a distance determined from coordinates of the real position that precede the first time to update the virtual position when the movement does not exceed the predefined threshold or the movement falls within the center range.

4. A method of tracking a conductive object on a touch sensitive surface having a plurality of touch sensors, comprising:
determining a real position of the conductive object on the touch sensitive surface and a corresponding virtual position of the conductive object based on scanning the plurality of touch sensors at an initial time;
scanning the plurality of touch sensors at a subsequent plurality of times to obtain a plurality of sensor readings;

using the plurality of sensor readings to compare movement of the conductive object during a first time of the plurality of times to a predefined threshold distance and to compare the movement to a center range based on scans at the plurality of times other than the first time;

when the movement exceeds the predefined threshold distance and the movement falls outside of the center range, updating the virtual position from the plurality of sensor readings using a distance between first coordinates of a first scan at a first time of the plurality of times and second coordinates of a second scan at a second time of the plurality of times before the plurality of sensor readings; and when the movement does not exceed the predefined threshold distance or the movement falls within the center range, update the virtual position using a distance between coordinates of the real position at times immediately preceding the first time.

5. The method of claim 4, further comprising:

discarding coordinates associated with the real position from a virtual position calculation when the movement exceeds the predefined threshold and the movement falls outside of the center range.

6. The method of claim 4, further comprising:

when the movement does not exceed the predefined threshold or the movement falls within the center range, applying a distance determined from previous and adjacent coordinates of the real position to update the virtual position.

7. The method of claim 4, further comprising:

performing a jump detection on two sets of sensor readings independently, each set for a different simultaneous finger trajectory.

8. An apparatus, comprising:

a processor;

an I/O circuit to interface the processor to a plurality of touch sensors of a touch sensitive surface;

a logic circuit configured to:
   determine a real position of a conductive object on the touch sensitive device and a corresponding virtual position of the conductive object based on scanning the plurality of touch sensors at an initial time;
   obtain readings at a plurality of times of the touch sensors from the I/O circuit to the processor;
   use the plurality of sensor readings to compare movement of the conductive object during a first time of the plurality of times to a predefined threshold distance and to compare the movement to a center range based on scans at the plurality of times other than the first time;
   when the movement exceeds the predefined threshold distance and the movement falls outside of the center range, update the virtual position from the plurality of sensor readings using a distance between first coordinates of a first reading at a first time of the plurality of times and second coordinates of a second reading at a second time of the plurality of times prior to the plurality of sensor readings; and
   when the movement does not exceed the predefined threshold distance or the movement falls within the center range, update the virtual position using a distance between coordinates of the real position at times immediately preceding the first time.

9. The apparatus of claim 8, wherein the logic circuit is further configured to:

cause the processor to discard coordinates associated with the real position from a virtual position calculation when the movement exceeds the predefined threshold and the movement falls outside of the center range.

10. The apparatus of claim 8, wherein the logic circuit is further configured to:

cause the processor to apply a distance to previous and adjacent coordinates associated with the readings of the touch sensors to update the virtual position when when the movement does not exceed the predefined threshold or the movement falls within the center range.

11. The apparatus of claim 8, wherein the logic circuit is further configured to:

divide the sensor readings into a plurality of sets, each set representing a finger trajectory, and to perform jump detection on each set of sensor readings.

* * * * *

UNITED STATES PATENT AND TRADEMARK OFFICE
CERTIFICATE OF CORRECTION

PATENT NO. : 9,507,454 B1
APPLICATION NO. : 13/428721
DATED : November 29, 2016
INVENTOR(S) : Koblyuk It is certified that error appears in the above-identified patent and that said Letters Patent is hereby corrected as shown below:

In the Claims

Claim 10, Column 16, Line 32, please delete "position when when" and insert --position when--.

Signed and Sealed this
Twenty-eighth Day of February, 2017

Michelle K. Lee
*Director of the United States Patent and Trademark Office*